(12) United States Patent
Nelson et al.

(10) Patent No.: US 6,798,079 B2
(45) Date of Patent: Sep. 28, 2004

(54) TURBINE POWER GENERATOR INCLUDING SUPPLEMENTAL PARALLEL COOLING AND RELATED METHODS

(75) Inventors: Robert J. Nelson, Orlando, FL (US); Kim M. McCreight, Oviedo, FL (US); Bobby A. Warren, Chuluota, FL (US); James F. Lau, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 75 days.

(21) Appl. No.: 10/193,399

(22) Filed: Jul. 11, 2002

(65) Prior Publication Data

US 2004/0007878 A1 Jan. 15, 2004

(51) Int. Cl.[7] .......................... F01D 15/10; H02K 9/00; F01K 15/00
(52) U.S. Cl. .............................. 290/2; 310/58
(58) Field of Search ................................ 290/2; 310/58

(56) References Cited

U.S. PATENT DOCUMENTS

| | | | | |
|---|---|---|---|---|
| 1,499,696 A | | 7/1924 | Rudenberg | 310/58 |
| 1,599,065 A | | 9/1926 | Rudenberg | 310/58 |
| 1,751,424 A | | 3/1930 | Rosenthal | 310/53 |
| 2,962,873 A | * | 12/1960 | Anderson | 62/180 |
| 3,634,705 A | * | 1/1972 | Fidei | 310/57 |
| 3,702,964 A | * | 11/1972 | Kudlacik et al. | 322/59 |
| 3,702,965 A | * | 11/1972 | Drexler | 322/25 |
| 3,742,706 A | * | 7/1973 | Klompas | 60/726 |
| 3,765,480 A | * | 10/1973 | Fries | 165/86 |
| 3,791,682 A | * | 2/1974 | Mitchell | 290/2 |
| 3,796,045 A | * | 3/1974 | Foster-Pegg | 60/772 |
| 3,816,751 A | * | 6/1974 | Jampen et al. | 290/2 |
| 3,936,651 A | * | 2/1976 | Abolins et al. | 290/1 R |
| 3,950,665 A | * | 4/1976 | Schneider et al. | 310/260 |
| 4,010,378 A | * | 3/1977 | Tharpe et al. | 290/2 |
| 4,051,400 A | * | 9/1977 | Armor et al. | 310/58 |
| 4,228,374 A | * | 10/1980 | Elsel | 310/53 |
| 4,262,224 A | * | 4/1981 | Kofink et al. | 310/54 |
| 4,555,902 A | * | 12/1985 | Pilarczyk | 60/39.5 |
| 4,682,068 A | * | 7/1987 | Cotzas et al. | 310/198 |
| 5,073,087 A | | 12/1991 | Harrison et al. | 416/219 R |
| 5,449,961 A | * | 9/1995 | Ludwig et al. | 310/58 |
| 5,697,207 A | * | 12/1997 | Cromer et al. | 60/772 |
| 5,731,644 A | * | 3/1998 | Drlik | 310/58 |
| 6,037,683 A | * | 3/2000 | Lulay et al. | 310/52 |
| 6,112,544 A | * | 9/2000 | Blatter et al. | 62/434 |
| 6,178,733 B1 | * | 1/2001 | Nelson | 60/778 |

FOREIGN PATENT DOCUMENTS

DE 3430023 2/1986

* cited by examiner

Primary Examiner—Nicholas Ponomarenko
Assistant Examiner—Pedro J. Cuevas

(57) ABSTRACT

A turbine power generator 20 includes a housing 22, a shaft 24, a turbine 26 to drive the shaft, a shaft-driven generator rotor 28, and generator stator 30 within the housing and surrounding the rotor. A main cooling gas blower 32 includes at least one blade 34 driven by the shaft 24 for causing a main flow of cooling gas to cool the rotor 28 and/or stator 30. A supplemental cooling gas blower 36 is connected in parallel with the main cooling gas blower 32 for causing a supplemental flow of cooling gas through the housing 22 in addition to the main flow of cooling gas to cool the rotor 28 and/or stator 30. The supplemental cooling gas blower may include an electric motor 38 and at least one blade 40 driven thereby. A controller 39 may be connected to the electric motor 38 to permit selective operation of the supplemental cooling gas blower 36.

23 Claims, 4 Drawing Sheets

TURBINE POWER GENERATOR INCLUDING SUPPLEMENTAL PARALLEL COOLING AND RELATED METHODS

FIELD OF THE INVENTION

The present invention relates to the field of power generation, and, more particularly, to the cooling of turbine generators.

BACKGROUND OF THE INVENTION

A turbine power generator generates electric power by converting mechanical energy into electrical energy. The turbine power generator typically includes a stator and rotor to generate electrical power as the rotor turns within the stator. The rotor is driven by the rotation of a drive shaft that connects to and turns the rotor. The drive shaft of the turbine power generator is, in turn, driven by steam or combustion supplied within a turbine section of the turbine power generator.

In a steam turbine generator, the shaft is driven by high-pressure saturated steam produced by a boiler and supplied to the turbine section. The boiler is fired by a fossil fuel (e.g., natural gas, coal, or lignite) or heated by a nuclear reactor. With a combustion turbine, the shaft is turned by an expansion of hot gas within the turbine section where air enters an inlet, is compressed by an air compressor, and then supplied to a combustor where fuel (e.g., natural gas) is burned to produce the hot gas. The hot gas then travels through the turbine section where the expanding gas drives the shaft of the turbine.

As the drive shaft turns the rotor within the stator, electrical current is generated and flows through respective windings mounted on the rotor and stator. The electrical current flow through the windings generates heat. Heat is also generated by hysteresis losses from changing magnetic fields, as well as from windage heating caused by moving cooling gas. Therefore, to maintain the temperature of the turbine power generator within a desirable range during its operation, a way of cooling the stator and rotor is needed. Accordingly, many large turbine generators include some type of blower and heat exchanger as well as passageways through which to circulate air or some other cooling medium (e.g., hydrogen gas). More specifically, the heat exchanger may be used as part of a cooling circuit that includes, for example, the blower for supplying the cooling medium to the heat exchanger. In some instances, particularly with respect to combustion turbine generators, a circulating cooling gas is propelled by a shaft-mounted blower and discharged to the atmosphere.

In a conventional turbine generator, the blower typically is mounted on the shaft or rotor of the electrical generator. Therefore, as the shaft is rotated, blades of the blower are rotated as well. The advantages and performance capabilities of a shaft-mounted blower, however, are limited. For example, a shaft-mounted blower has a relatively low thermal efficiency. Typically, it is 30–50 percent for a single-stage, shaft-mounted blower, as would typically be used in an air-cooled generator.

Attempts to improve the cooling of a turbine power generator have to date focused on increasing the flow of air or gas around the stator and rotor by adding additional shaft-mounted blowers in series with one another. This approach is typified by U.S. Pat. No. 5,073,087 to Harrison et al., for example, which discloses a blower hub mounted on a rotor shaft of a generator. The hub is constructed to carry four blades arranged in series with one another.

A shortcoming of this approach, however, is that blowers arranged in series with one another tend to increase flow rate at the expense of stage pressure, thereby limiting the benefit that can be obtained by adding additional pressure stages. Additional shortcomings are the cost and additional shaft length associated with multi-stage blowers.

In general, the output of a turbine generator is correlated with how well the generator can be cooled. It follows that the turbine generator's output can be increased if the cooling capability of the blower is increased. As already noted, however, adding an additional blower in series with an existing one reduces the output of the existing shaft-mounted blower. Thus, upgrading a generator's performance capability by using a series blower is likely to be costly because the additional series blower must be sized to compensate for the reduction in output of the existing shaft-mounted blower. Moreover, because the design and installation of new shaft-mounted blowers is difficult and costly, the opportunities provided by such blowers for upgrading the performance capability of a turbine generator are further limited.

SUMMARY OF THE INVENTION

In view of the foregoing background, it is an object of the present invention to provide a more effectively cooled turbine power generator.

This and other objects, features, and advantages in accordance with the present invention are provided by a turbine power generator having supplemental air cooling capability and related methods for generator cooling. The turbine power generator may include a housing, a shaft, a turbine for driving the shaft, a generator rotor driven by the shaft, a generator stator within the housing and surrounding the generator rotor, and a cooling gas blower for causing a main flow of gas through the housing.

More particularly, the turbine power generator preferably includes a supplemental cooling gas blower in parallel with the main cooling gas blower for causing a supplemental flow of gas through the housing to thereby more effectively cool the generator rotor and/or generator stator. Unlike conventional blowers arranged in series with one another, the main and supplemental blowers are arranged in parallel with one anther. Accordingly, the main and supplemental blowers do not generate a pressure that would otherwise offset the enhanced gas flow provided by adding the capability of the supplemental blower to that of the main blower.

The supplemental cooling gas blower may comprise an electric motor and at least one blower driven by the electric motor. Thus, whereas the main cooling gas blower may operate by rotation of a shaft-mounted set of blades, the supplemental cooling gas blower may be powered by the electric motor. The supplemental cooling gas blower may be positioned externally from the generator housing.

The main and supplemental cooling gas blowers may each include an inlet. The blower inlets may be connected in parallel with each other. The blower inlets may also be in fluid communication with at least one generator housing outlet. Additionally, the main and supplemental air blowers may each include an outlet. The blower outlets may also be connected in parallel with one another. The blower outlets, moreover, may be in fluid communication with at least one generator housing inlet.

The main and supplemental cooling gas blowers may be arranged relative to at least one of the generator rotor and the generator stator to draw gas over and through the generator rotor and/or generator stator. Alternately, the main and supplemental cooling gas blowers may be arranged relative to at least one of the generator rotor and generator stator to force a flow of cooling gas over and/or through the generator rotor and/or generator stator.

The supplemental cooling gas blower may, but need not be, used on a continual basis. Instead, the supplemental cooling gas blower may be used on a selective basis only at times when enhanced cooling capacity is needed. Accordingly, the supplemental cooling gas blower may include a controller connected, for example, to the cooling gas blower's electric motor to allow the cooling gas blower to be operated on a selective basis.

An additional aspect of the present invention pertains to a method of cooling a turbine power generator. Cooling may be accomplished by operating the turbine power generator so that a main cooling gas blower causes a main flow of cooling gas through the housing, and additionally providing a supplemental flow of cooling gas to thereby enhance the cooling capability of the turbine power generator. The supplemental flow of cooling gas may be provided by selectively operating an electric motor of a supplemental cooling gas blower, the supplemental cooling gas blower being connected in parallel with the main cooling gas blower.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
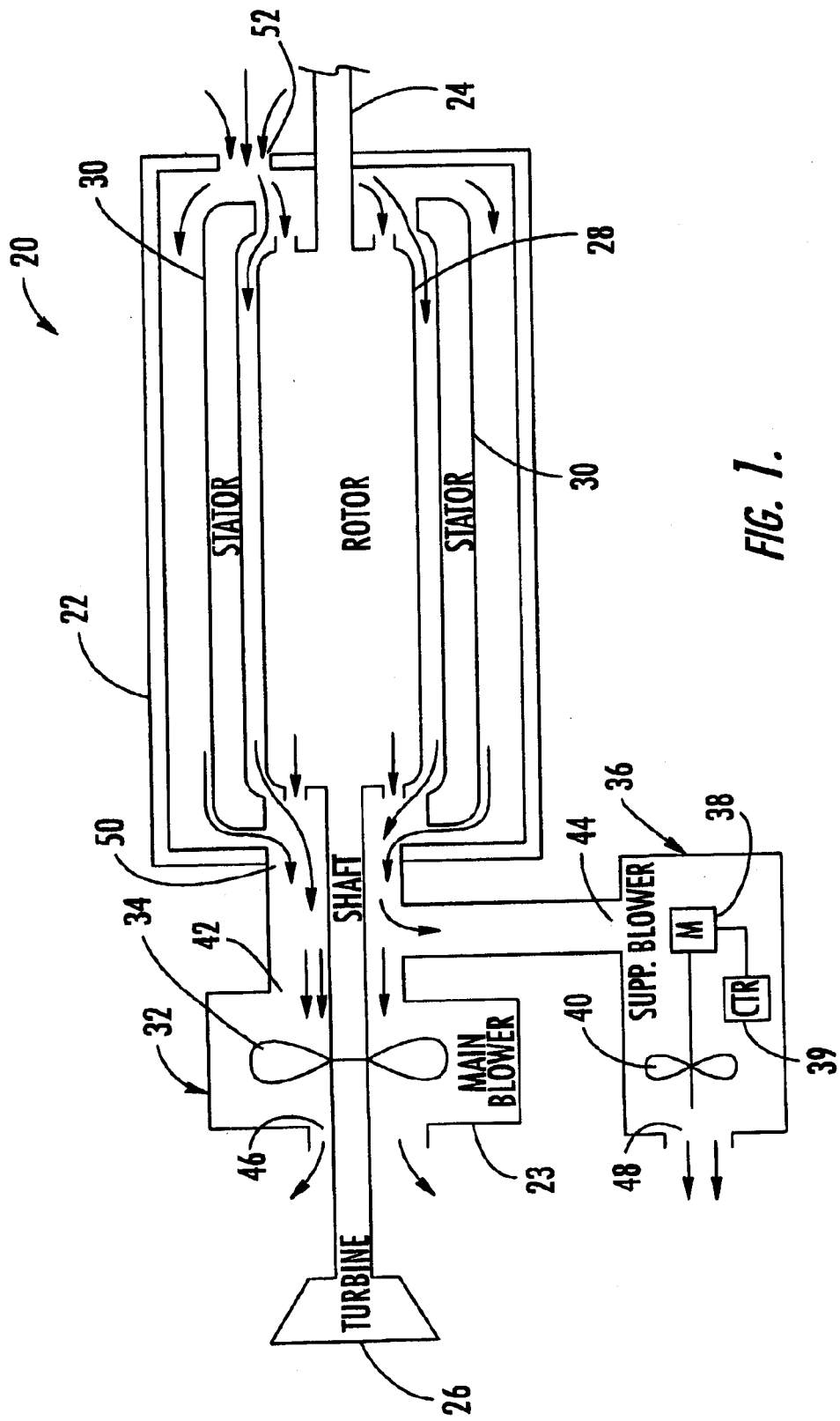
FIG. 1 is a schematic view of a turbine power generator according to one embodiment of the present invention.

Referring initially to FIG. 1, a turbine power generator 20 including parallel supplemental cooling is now described in accordance with one embodiment of the present invention. The turbine power generator 20 illustratively includes a housing 22, a shaft 24, a turbine 26 to drive the shaft, a generator rotor 28 driven by the shaft, and a generator stator 30 within the housing and surrounding the generator rotor. The turbine power generator 20 also illustratively includes a main cooling gas blower 32 comprising at least one blade 34 mounted on and driven by the shaft 24. The main cooling gas blower 32 causes a main flow of cooling gas through the housing 22 to cool at least one of the generator rotor 28 and the generator stator 30, as will be readily appreciated by those skilled in the art.

The turbine power generator 20 also includes a supplemental cooling gas blower 36 to generate a supplemental flow of cooling gas through the housing 22. The supplemental cooling gas blower 36 illustratively includes an electric motor 38 and at least one blade 40 driven by the electric motor. The supplemental cooling gas blower 36 may be used on a selective basis at times when enhanced cooling capacity is needed, as, for example, during times of inordinately hot or cold weather. Accordingly, the supplemental cooling gas blower 36 also illustratively includes a controller 39 connected to the cooling gas blower's electric motor 38 to allow the cooling gas blower to be operated on a selective basis. Although not shown, it will be readily appreciated by those skilled in the art, that a check valve or reverse-flow damper can used adjacent the supplemental cooling gas blower 36 to prevent reverse gas flow during periods that the supplemental cooling gas blower is not in operation. The supplemental blower 36 is connected in parallel with the main cooling gas blower 32. The supplemental flow of cooling gas is in addition to the main flow of cooling gas and increases the amount of gas flow available to cool the generator rotor 28 and/or the generator stator 30. The parallel arrangement of the main and supplemental blowers 32, 36 according to the present invention contrasts with that of conventional turbine power generators, which typically rely solely on internal blowers comprising one or more sets of blades arranged in series. By contrast, the main and supplemental air blowers 32, 36 of the present invention are arranged in parallel. Because turbine power generator output is a function of how effectively the generator is cooled, the output of the turbine power generator 20 is enhanced by the parallel cooling.

Illustratively, the supplemental cooling gas blower 36 is external to the housing 22. Alternately, however, the supplemental cooling gas blower 36 may be positioned within the housing 22. Likewise, the main cooling gas blower 32 may either be contained within the housing 22 or be positioned externally thereto.

The main cooling gas blower 32 is illustratively contained within an end box 23, and the parallel supplemental cooling gas blower 36 draws cooling gas out of the end box before the gas enters the main cooling gas blower 32. The main cooling gas blower 32 illustratively includes an inlet 42. The supplemental cooling gas blower 36 also illustratively includes an inlet 44. The inlets 42, 44, as illustrated, may be connected in parallel with one another in some embodiments of the invention. The main and supplemental cooling gas blowers 32, 36 also illustratively include respective outlets 46, 48. The outlets 46, 48 are illustratively connected in parallel with one another.

The housing 22 likewise includes at least one outlet 50, with which the respective inlets 42, 44 of the main and supplemental cooling gas blowers 32, 36 are illustratively in fluid communication. The housing 22 additionally includes at least one inlet 52.

The main and supplemental cooling gas blowers 32, 36 may be arranged relative to at least one of the generator rotor 28 and the generator stator 30 to force a flow of cooling gas or draw a flow of cooling gas over the generator rotor 28 and/or stator 30. As shown in FIG. 1, the main and supplemental cooling gas blowers 32, 36 are arranged relative to the generator rotor and stator 28, 30 to draw cooling gas over the rotor and stator, as well as through the rotor. More particularly, cooling gas is drawn through the inlet 52 of the housing 50 over and through the generator rotor 28 and over the generator stator 30. The gas is then exhausted through the respective outlets 46, 48 of the main and supplemental cooling gas blowers 32, 36. If the cooling gas is air, it may be discharged into the atmosphere thereby defining an open air cooled (OAC) system.

Figure 2:
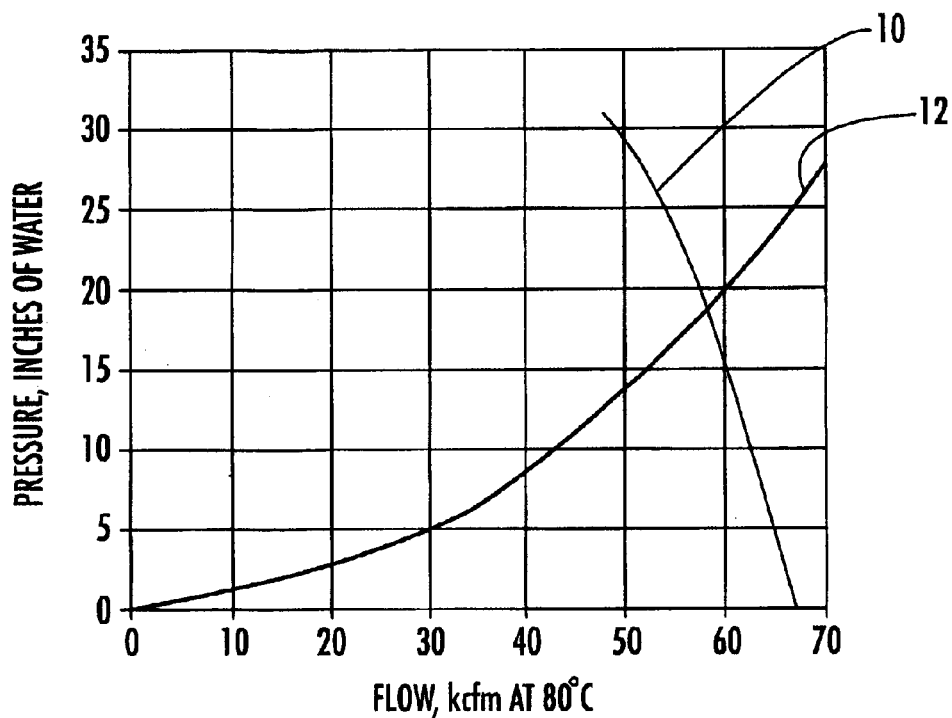
FIG. 2 is a plot of blower pressure versus flow capacity and a plot of back pressure versus flow capacity representative of the values used according to the present invention.

The back pressure of a blower positioned in an end box of a representative open air cooled generator can be approximated to be $P=K*Q^2$, where Q is flow capacity, P is pressure, and K is a constant that is dependent on the machine design and measurement parameters. A plot of flow capacity versus blower pressure (plot 10) and a plot of flow capacity versus back pressure (plot 12) are shown on the graph in FIG. 2. Without the additional capacity of a supplemental cooling gas blower 36, it is estimated that the end box back pressure and the machine air flow rate are determined by the intersection of the two curves in FIG. 2.

The additional capacity of the external supplemental blower 36 connected in parallel with the main blower 32 increases the end box pressure to another level P', such that $P' \geq P$, and it is estimated that the combined flow capacity can be increased to roughly $(P'/P)^{1/2}$. The energy consumption of the external supplemental cooling gas blower 36 is given by the relationship $W=CFM \times BP/(Kb \times Eff)$, where CFM and BP are, respectively, the flow rate and developed pressure of the external blower, Eff is its thermal efficiency, and Kb is a unit-dependent constant. Because of the high thermal efficiency typical of multi-stage external blowers compared to those of shaft mounted blowers (typically, the efficiency is roughly twice as high), the incremental loss associated with this technique is roughly only half of that which would be obtained by increasing the capability of a shaft-mounted blower. Normally, the energy could be supplied by an electric motor 38 of relatively modest size (typically on the order 0.1% of the generator capability for a roughly 15% increase in generator air flow for an air-cooled generator).

Figure 3:
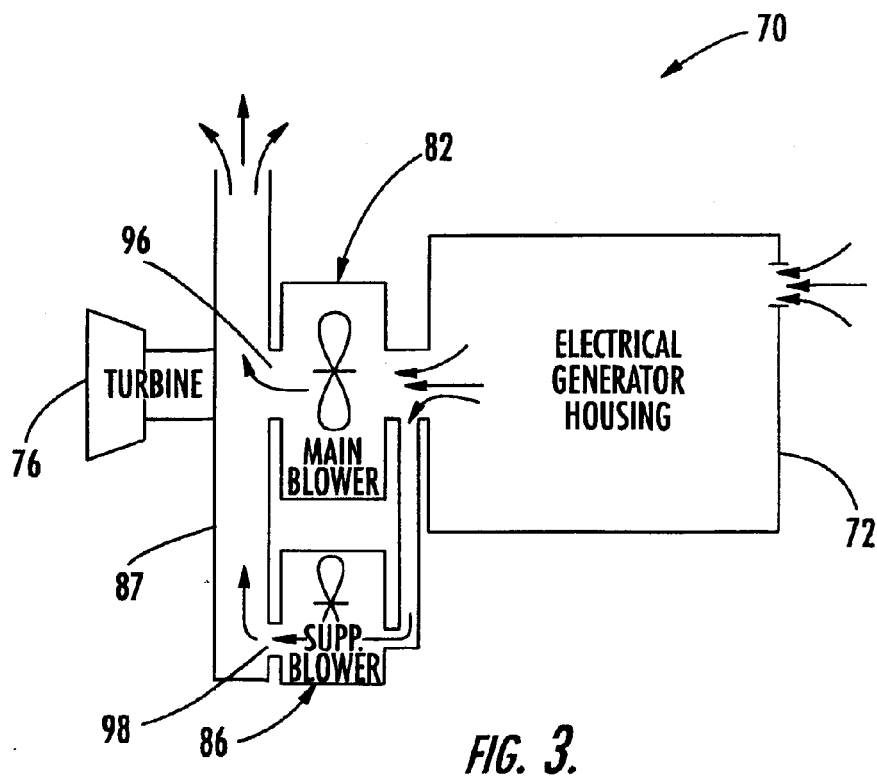
FIG. 3 is a simplified schematic view of a turbine power generator according to another embodiment of the present invention.

As illustrated in FIG. 3, the main and supplemental gas flows of an open air cooled turbine power generator 70 alternately may be exhausted from the main and supplemental cooling gas blowers 82, 86 to an exhaust diffuser 87 rather than directly to the atmosphere. Illustratively, the exhaust diffuser 87 is connected to the main and supplemental cooling gas blowers 82, 82 by respective ducts 96, 98. The main and supplemental cooling gas blowers 82, 86 and the exhaust diffuser 87 are illustratively positioned relative to the housing 72 on the same side as the turbine 76.

Figure 4:
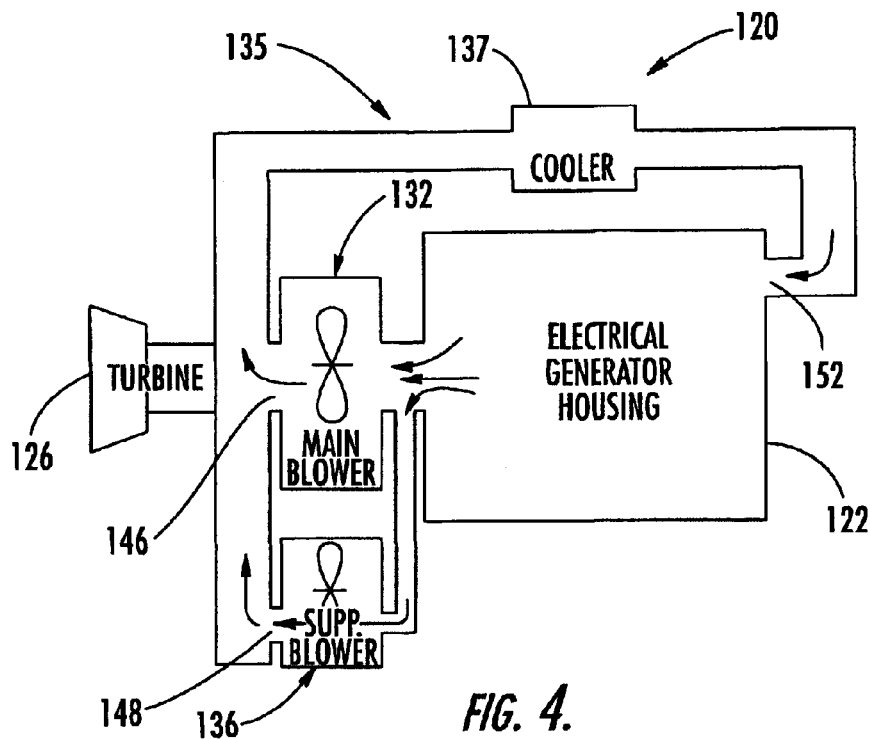
FIG. 4 is a simplified schematic view of a turbine power generator according to yet another embodiment of the present invention.

In yet a further embodiment illustrated in FIG. 4, the turbine power generator 120 may define a totally enclosed water-to-air cooled (TEWAC) system in which the main and supplemental cooling gas flows are water cooled. Alternately, as will be readily appreciated by those skilled in the art, the system may comprise a hydrogen-cooled system in which the main and supplemental cooling gas flows are cooled by a coolant such as water. The generator 120 includes a cooling circuit 135 comprising a cooler 137 and respective ducts 146, 148 connecting the circuit with the main and supplemental cooling gas blowers 132, 136. Cooling gas is drawn through the housing 122 by the main cooling gas blower 132 causing a main flow of cooling gas, and by the supplemental cooling gas blower 136 causing a supplemental flow of cooling gas. The main and supplemental gas flows are then passed through the respective ducts 146, 148 of the cooling circuit and cooled by the cooler 137.

Cooled gas is then returned to the housing 122 via an inlet 152. The main and supplemental cooling gas blowers 132, 136 are illustratively positioned relative to the housing 122 on the same side as the turbine 126.

Figure 5:
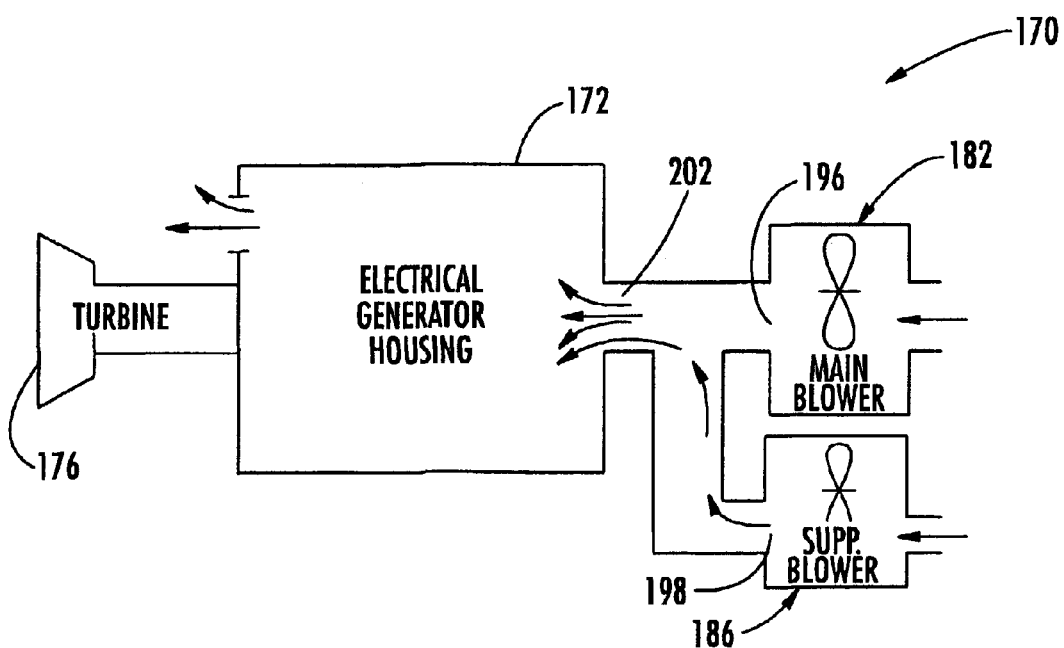
FIG. 5 is a simplified schematic view of a turbine power generator according to still another embodiment of the present invention.

In still another embodiment illustrated in FIG. 5, the turbine power generator 170 includes main and supplemental cooling gas blowers 182, 186 arranged to force in, rather than draw, cooling gas (ambient air, for example) through the generator housing 172 to thereby cool the generator rotor and/or generator stator therein. The housing 172 illustratively includes an inlet 202, and the main and supplemental cooling gas blowers 182, 186 include respective outlets 196, 198 in fluid communication with the inlet 202 of the housing 172. The gas forced through the housing 172 is drawn directly from the atmosphere surrounding the housing by the parallel main and supplemental cooling gas blowers 182, 186. Illustratively, the main and supplemental cooling gas blowers 182, 186 are positioned relative to the housing 202 close to the inlet. Although not shown, it will be readily appreciated by those skilled in the art, that yet an additional blower can be added at the opposing end of the housing 172 for more symmetric ventilation.

Figure 6:
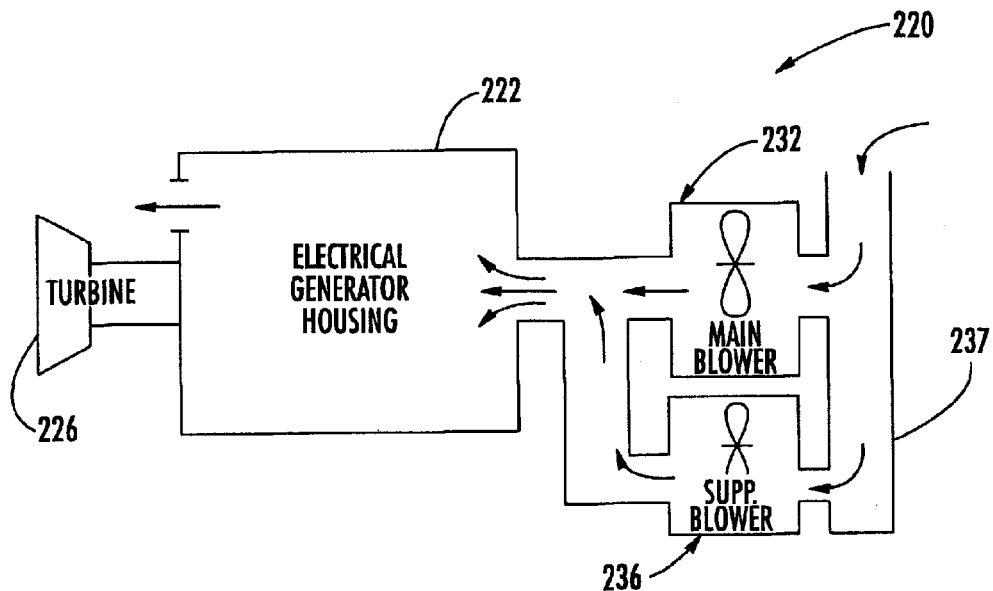
FIG. 6 is a simplified schematic view of a turbine power generator according to a further embodiment of the present invention.

Alternately, in the embodiment illustrated in FIG. 6, the main and supplemental gas flows are forced through the housing 222 of the turbine power enerator 220 by the main and supplemental cooling gas blowers 232, 236 drawing cooling gas (ambient air, in this case) in through an intake 237. The main and supplemental cooling gas blowers 232, 236 are illustratively positioned relative to the housing 222 close to the inlet. Again, an additional blower can be added at the opposing end of the housing 222 for more symmetric ventilation, as will be readily understood by those skilled in the art.

Figure 7:
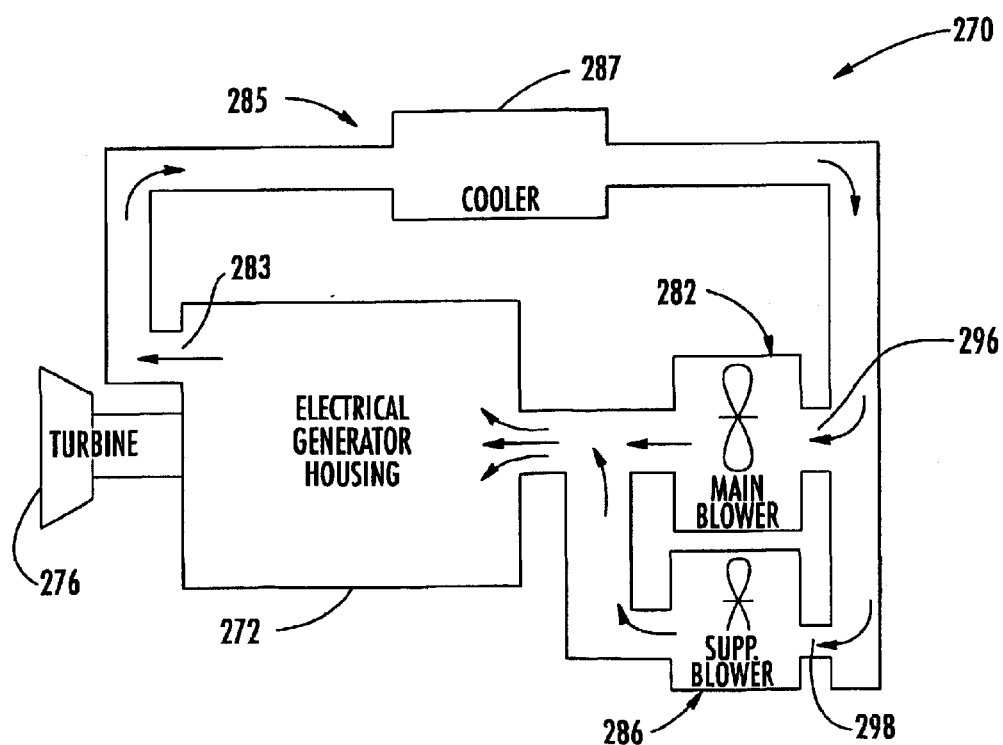
FIG. 7 is a simplified schematic view of a turbine power generator according to yet a further embodiment of the present invention.

In yet a further embodiment illustrated in FIG. 7, the main and supplemental gas flows are forced through the generator housing 272 of the turbine power generator 270 by the main and supplemental blowers 282, 286, which are each connected to a cooling circuit 285. The cooling circuit 285 includes a cooler 287, inlet duct 283 and first and second outlet ducts 296, 298. Cooling gas exits the housing 272 and is received from the housing through the exhaust duct 283. The gas is cooled by the cooler 287 and then provided to the main and supplemental gas blowers 282, 286 through the first and second cooler outlet ducts 296, 298. Illustratively, the main and supplemental blowers 282, 286 are positioned relative to the housing 272 on a side opposite the turbine 276. Also another blower can be added at the opposing end of the housing 272 for more symmetric ventilation, as, again, will be readily appreciated by those skilled in the art.

An additional aspect of the present invention pertains to a method of cooling a turbine power generator. Referring again to FIG. 1 by way of example, the method preferably includes operating the turbine power generator so that a main cooling gas blower 32 causes a main flow of cooling gas through the generator housing 22 to cool the generator rotor 28 and/or generator stator 30. The method also includes operating an electric motor 38 of a supplemental cooling gas blower 36 connected in parallel with the main cooling gas blower to thereby cause a supplemental flow of cooling gas in addition to the main flow of cooling gas.

The supplemental cooling gas blower 36, for example, can be fitted to an existing turbine power generator having only a main cooling gas blower, thus providing increased cooling and improved operational performance of the turbine power generator as described above. The method may further include connecting a controller 39 to the electric motor 38 of the supplemental cooling gas blower 36 so that it may be operated on a selective basis such as during unusually hot weather conditions.

Many modifications and other embodiments of the invention will come to the mind of one skilled in the art having That which is claimed is:

1. A turbine power generator comprising:
   a housing;
   a shaft;
   a turbine driving said shaft;
   a generator rotor driven by said shaft;
   a generator stator within said housing and surrounding said generator rotor;
   a main cooling gas blower comprising at least one blade driven by said shaft for causing a main flow of cooling gas through said housing to cool at least one of said generator rotor and generator stator; and
   a supplemental cooling gas blower comprising an electric motor and at least one blade driven thereby, said supplemental cooling gas blower connected in parallel with said main cooling gas blower for causing a supplemental flow of cooling gas through said housing in addition to the main flow of cooling gas to cool at least one of said generator rotor and generator stator.

2. A turbine power generator according to claim 1 wherein said main cooling gas blower has an inlet; and wherein said supplemental cooling gas blower also has an inlet connected in parallel with the inlet of said main cooling gas blower.

3. A turbine power generator according to claim 1 wherein said main cooling gas blower has an outlet; and wherein said supplemental cooling gas blower also has an outlet connected in parallel with the outlet of said main cooling gas blower.

4. A turbine power generator according to claim 1 wherein said main and supplemental cooling gas blowers are arranged relative to at least one of said generator rotor and generator stator to draw cooling gas thereover.

5. A turbine power generator according to claim 4 wherein said housing has at least one outlet; and wherein said main and supplemental cooling gas blowers have respective inlets in fluid communication with the at least one outlet of said housing.

6. A turbine power generator according to claim 1 wherein said main and supplemental cooling gas blowers are arranged relative to at least one of said generator rotor and generator stator to force cooling gas thereover.

7. A turbine power generator according to claim 6 wherein said housing has at least one inlet; and wherein said main and supplemental cooling gas blowers have respective outlets in fluid communication with the at least one inlet of said housing.

8. A turbine power generator according to claim 1 wherein said main and supplemental cooling gas blowers are arranged to cool both said generator rotor and said generator stator.

9. A turbine power generator according to claim 1 wherein said supplemental cooling gas blower is positioned external to said housing.

10. A turbine power generator according to claim 1 wherein said supplemental cooling gas blower further comprises a controller connected to said electric motor to permit selective operation of said supplemental cooling gas blower.

11. A turbine power generator according to claim 1 wherein the main and supplemental cooling gas flows are exhausted into the atmosphere to define an open air cooled (OAC) system.

12. A turbine power generator according to claim 1 wherein the main and supplemental cooling gas flows are water cooled and recycled to define a totally enclosed water-to-air cooled (TEWAC) system.

13. A turbine power generator according to claim 1 wherein the main and supplemental cooling gas flows are cooled and recycled to define a hydrogen-cooled system.

14. A turbine power generator comprising:
   a housing;
   a shaft;
   a turbine driving said shaft;
   a generator rotor driven by said shaft;
   a generator stator within said housing and surrounding said generator rotor;
   a main cooling gas blower comprising at least one blade driven by said shaft for causing a main flow of cooling gas through said housing to cool said generator rotor and generator stator; and
   a supplemental cooling gas blower positioned external from said housing and comprising an electric motor and at least one blade driven thereby, said supplemental cooling gas blower connected in parallel with said main cooling gas blower for causing a supplemental flow of cooling gas through said housing in addition to the main flow of cooling gas to cool said generator rotor and generator stator.

15. A turbine power generator according to claim 14 wherein said supplemental cooling gas blower further comprises a controller connected to said electric motor to permit selective and variable output ventilation operation of said supplemental cooling gas blower.

16. A turbine power generator according to claim 14 wherein the main and supplemental cooling gas flows are exhausted into the atmosphere to define an open air cooled (OAC) system.

17. A turbine power generator according to claim 14 wherein the main and supplemental cooling gas flows are water cooled and recycled to define a totally enclosed water-to-air cooled (TEWAC) system.

18. A turbine power generator according to claim 14 wherein the main and supplemental cooling gas flows are cooled and recycled to define a hydrogen-cooled system.

19. A method of cooling a turbine power generator comprising a housing, a shaft, a turbine driving the shaft, a generator rotor driven by the shaft, a generator stator within the housing and surrounding the generator rotor, and a main cooling gas blower driven by the shaft, the method comprising:
   operating the turbine power generator so that the main cooling gas blower causes a main flow of cooling gas through the housing to cool at least one of the generator rotor and generator stator; and
   operating an electric motor of a supplemental cooling gas blower connected in parallel with the main cooling gas blower for causing a supplemental flow of cooling gas through the housing in addition to the main flow of cooling gas to cool at least one of the generator rotor and generator stator.

20. A method according to claim 19 wherein the main and supplemental cooling gas flows cool both the generator rotor and generator stator.

21. A method according to claim 19 further comprising positioning the supplemental cooling gas blower external to the housing.

22. A method according to claim 19 further comprising connecting a controller to the electric motor to permit selective operation of the supplemental cooling gas blower.

23. A method according to claim 19 further comprising exhausting the main and supplemental cooling gas flows into the atmosphere to define an open air cooled (OAC) system.

* * * * *